United States Patent [19]

Schulz

[11] Patent Number: 5,161,926

[45] Date of Patent: Nov. 10, 1992

[54] PRECISION HEAD FOR A MACHINE TOOL

[75] Inventor: George W. Schulz, Shelby Township, Macomb County, Mich.

[73] Assignee: Xermac, Inc., Royal Oak, Mich.

[21] Appl. No.: 748,251

[22] Filed: Aug. 21, 1991

[51] Int. Cl.⁵ .............................................. B23Q 1/26
[52] U.S. Cl. .................................... 409/235; 384/53; 384/55; 384/57; 408/234
[58] Field of Search ..................... 384/53, 55, 57, 58; 408/234; 409/235

[56] References Cited

U.S. PATENT DOCUMENTS

| | | | |
|---|---|---|---|
| 2,378,212 | 6/1945 | Siern et al. | 384/57 |
| 2,522,695 | 9/1950 | Walter | 384/55 |
| 2,915,333 | 12/1959 | Friedman | 384/55 |
| 3,859,003 | 1/1975 | Schulz et al. | 408/234 |

Primary Examiner—Daniel W. Howell
Attorney, Agent, or Firm—Brooks & Kushman

[57] ABSTRACT

A precision head (10) for a machine tool includes a ram (12) axially movable along an axis A within an outer stationary ram support (14) of a polygonal shape. The outer stationary ram support (14) includes a pair of fixed bearing portions (16, 17) spaced from each other on one side (18) of the support (14) and a central bearing portion (20) on the other side (22) of the ram support (14) between the fixed bearing portions (16, 17). A pair of adjustable bearings (24, 25) bias the ram (12) against the pair of fixed bearing portions (16, 17). One of the adjustable bearing portions (24) is positioned on the central bearing portion (20) and the other adjustable bearing (25) is positioned in opposed relation to fixed bearing portion (16). The adjustable bearing portion (24) positions ram (12) with respect to the fixed bearing portions (16, 17). Adjustable bearing (25) positions ram (12) with respect to fixed bearing portion (16), whereby the ram (12) is positionable totally with respect to the outer stationary ram support (14) by adjustment of only two adjustable bearings (24, 25).

11 Claims, 2 Drawing Sheets

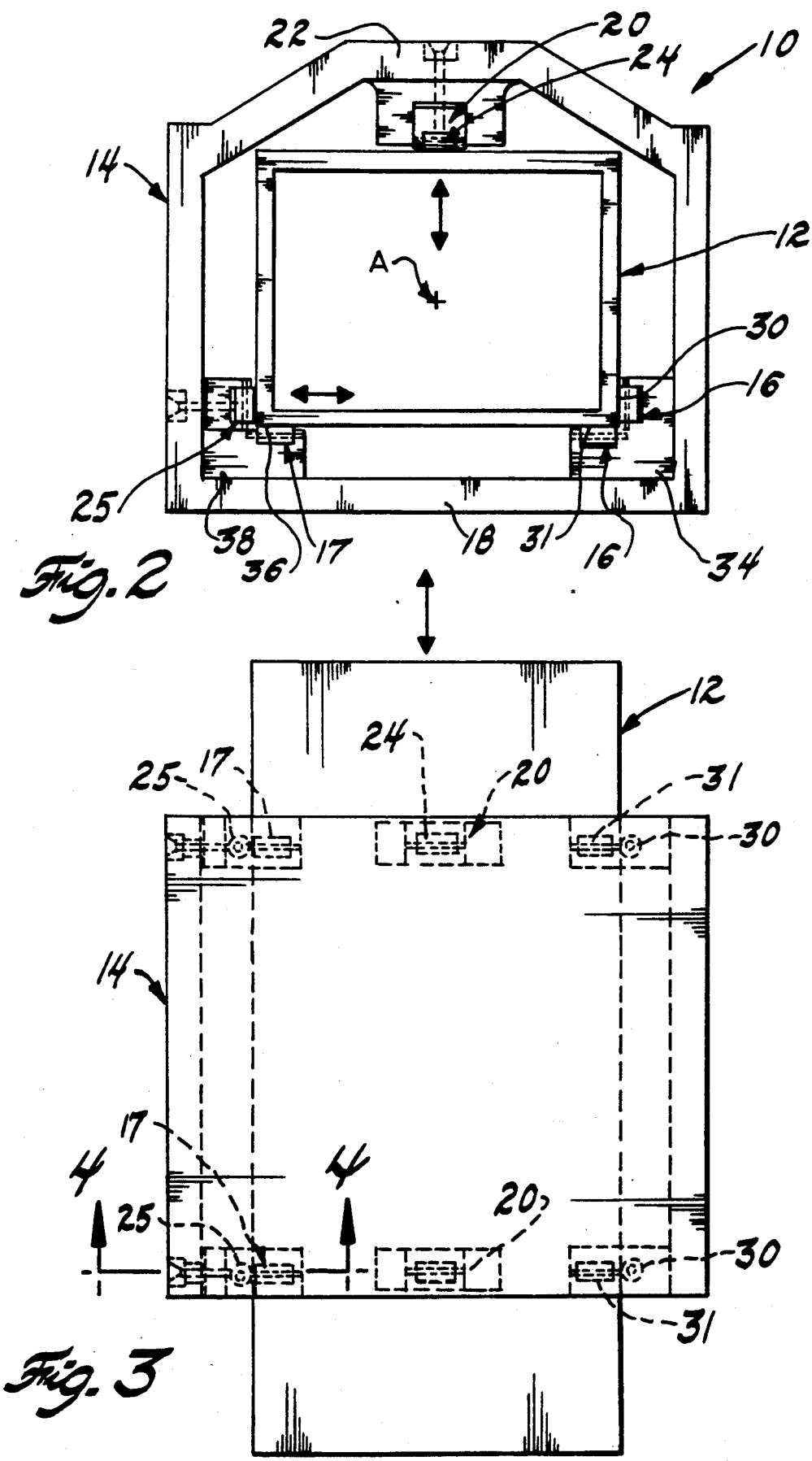

PRECISION HEAD FOR A MACHINE TOOL

TECHNICAL FIELD

This invention relates to precision machine tools, for example, those used in electrical discharge machining or in electrochemical machining, and more specifically, to an improved construction which provides accurate vertical movement and axial stability of a ram relative to a ram support so that there is little or no deflection of the ram about its vertical axis.

BACKGROUND ART

Conventional machine tools for electrical discharge machining, electrochemical machining or like operations, such as disclosed in my earlier U.S. Pat. No. 3,859,003, provide improved axial stability of a ram with respect to an outer ram support over earlier precision heads. However the costs associated with manufacturing such heads is substantial because of the raceway construction for receiving ball bearings which support the ram for axial movement within the outer ram support.

Also, in my two raceway embodiment, the ram when fully extended has been detected to deflect in a transverse direction to the plane extending through the two raceways. My four raceway embodiment is costly to manufacture and it is difficult to maintain alignment along the axial length of ram travel because of the four corner support.

DISCLOSURE OF INVENTION

An object of the present invention is to provide a precision head for a machine tool that utilizes three-point support for supporting a ram within a ram support to ensure axial stability of the ram with respect to the ram support.

Another object of the invention is to provide a precision head for a machine tool that is simpler in construction and provides economy of manufacture.

It is another object of the present invention to provide a precision head for a machine tool that utilizes two sets of three-point supports spaced from each other at a distance of at least 1½ times the travel distance of the ram to eliminate deflection about the vertical movement.

In carrying out the above objects and other objects of the invention, a precision head for a machine tool includes a ram axially movable along an axis. An outer stationary ram support supports the ram for axial movement. The ram support has a pair of fixed bearing portions spaced from each other on one side of the support and a central bearing portion on the other side of the ram support and located between the fixed bearing portions supports. A pair of adjustable bearing portions bias the ram against the pair of fixed bearing portions.

One of the adjustable bearing portions is positioned on the central bearing portion of the stationary ram support and the other of the adjustable bearing portions is positioned in the outer stationary ram support in opposed relation to one of the pair of fixed bearing portions. The adjustable bearing portion on the central portion is adjustable to position the ram with respect to the pair of fixed bearing portions. The other of the adjustable bearing portions is adjustable to position the ram with respect to one of the pair of fixed bearing portions whereby the ram is positionable totally with respect to the outer stationary ram support by adjustment of only two adjustable bearing portions.

Preferably, the bearing portions are roller bearings mounted in bearing holders and the precision head includes two sets of the fixed and adjustable bearing portions in spaced relation along the axis of the ram. Preferably, the spacing of the two sets of fixed and adjustable bearing portions is at a distance greater than the length of movement of the ram.

The precision head includes a locking means including an adjusting screw and lock screw commonly referred to as a hollow lock screw for locking the adjustable bearing portions against the ram to urge the ram into a prealigned relationship.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 2 is a sectional plan view of the precision head illustrating a ram and outer stationary ram support having fixed and adjustable bearing portions;

FIG. 3 is an elevational view of the ram and outer stationary ram support illustrating the spacing between two sets of fixed and adjustable bearing portions.

BEST MODE FOR CARRYING OUT THE INVENTION

Figure 1:
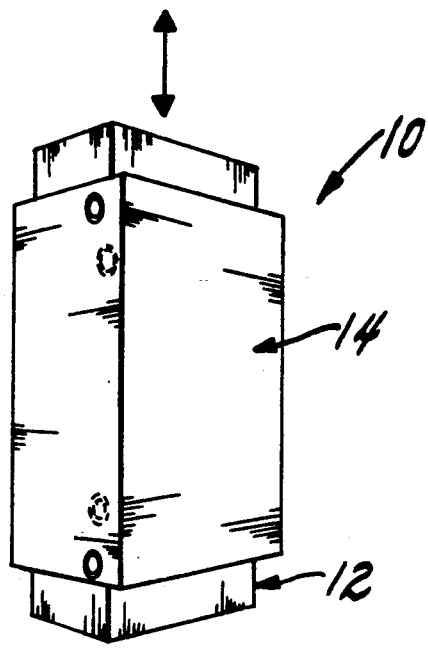
FIG. 1 is a general perspective view of a precision head constructed in accordance with the present invention.

Referring to FIG. 1 of the drawings, an improved precision head for a machine tool constructed in accordance with the present invention is generally indicated by reference numeral 10 and is used in conjunction with machining operations, such as electrical discharge machining from stamping, extrusion and forging dies and plastic molds, to jewelry and coining. A general discussion of such a head is given in my earlier U.S. Pat. No. 3,859,003 which is hereby incorporated by reference. As is more fully hereinafter described, the improved precision head 10 utilizes three-point support for supporting a ram 12 within an outer stationary ram support 14 to assure axial stability of the ram with respect to the ram support, provide economy of manufacture and eliminate deflection about the vertical movement. It will be understood that the present invention is not limited in its application to machine tools for electrical discharge machining or electrochemical machining, but indeed may be applied to any machine tool in which there is required accurate and precise movement of a tool or workpiece carrying ram in a vertical direction. It is likewise adaptable to machine tools in which the ram is movable along an axis other than the vertical one.

As shown in FIGS. 2 and 3, the precision head 10 includes ram 12 illustrated as having a rectangular cross section and being movable along an axis designated A. The outer stationary ram support 14 is of a polygonal shape and has a pair of fixed bearing portions or bearings 16,17 spaced from each other on one side 18 of the stationary ram support and a central bearing portion 20 on the other side 22 of the ram support between the fixed bearing portions. A pair of adjustable bearing portions or bearings 24, 25 bias the ram against the pair of fixed bearing portions 16, 17.

One of the adjustable bearings 24 is positioned on the central bearing portion 20 of the stationary ram support 14 and the other adjustable bearing portion 25 is positioned in the outer stationary ram support in opposed relation to one of the pair of fixed bearing portions 17. The adjustable bearing 24 on the central portion is adjustable to position the ram 12 with respect to the pair of fixed bearing portions 16, 17. The other adjustable bearing 25 is adjustable to position the ram 12 with respect to fixed bearing portion 16 whereby the ram is positionable totally with respect to the outer stationary ram support 14 by the adjustment of the two adjustable bearings.

Figure 4:
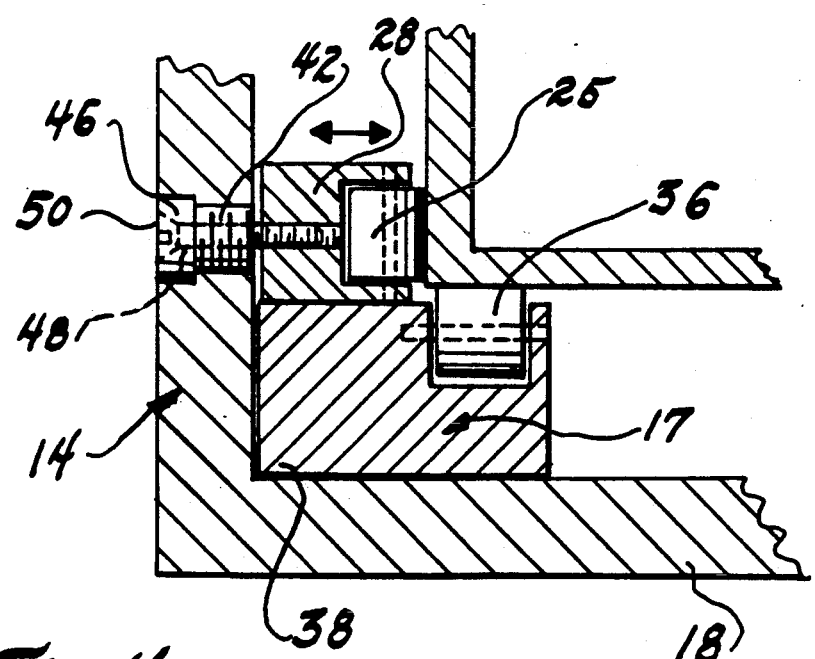
FIG. 4 is an exploded sectional view of an adjustable lock mechanism for biasing the adjustable bearing portions against the ram.

In the preferred embodiment of the invention the bearing portions 16,17 and bearings 24,25 are roller bearings mounted in bearing holders 28 as best seen in FIG. 4. Fixed bearing portion 16 includes two bearings 30,31 having perpendicular axis of rotation mounted in one corner 34 of the outer stationary ram support 14. Fixed bearing portion 17 includes bearing 36 mounted in the adjacent corner 38 of the outer stationary ram support 14.

With reference to FIG. 3, the stationary ram support 14 is elongate and includes two sets of fixed and adjustable bearing portions 16,17 and bearings 24,25, respectively. Each set is spaced from each other along the axis A a distance greater than the length of movement of the ram 12. Preferably the spacing is at least one-and-one-half times greater than the length of movement of the ram 12.

With reference to FIGS. 2 and 4, the outer stationary ram support 14 includes a hollow lock screw assembly 40 for locking the adjustable bearings 24,25 against the ram 12 to urge the ram into a prealigned relationship. The ram support 14 includes a first threaded portion 42 and the adjustable bearing holders 28 include a second threaded portion 44. The threaded portions 42,44 are coaxial with each other. An adjustment screw 46 having an aperture 48 therethrough extends through the first threaded portion 42 for initially engaging and preloading one of the adjustable bearings 24,25 against the ram 12. A lock screw 50 axially extendable through the aperture 48 and threadably engaging the second threaded portion 44 and having its head in abutment with the head of adjusting screw 46 locks it by pulling outwardly on the preloaded adjusting screw.

The triangular positioning of the fixed and adjustable bearing portions 16,17 and 24,25, respectively, creates a simplified positioning arrangement whereby the ram 12 is kept in position along the corner 34 by preloading the adjustable bearings 24,25 against the fixed bearing portion 16.

While the best mode for carrying out the invention has been described in detail, those familiar with the art to which this invention relates will recognize various alternative designs and embodiments for practicing the invention as defined by the following claims.

What is claimed is:

1. A precision head for a machine tool comprising:
   a ram axially movable along an axis;
   an outer stationary ram support of a polygonal shape having a pair of fixed bearing portions spaced from each other on one side thereof and a central bearing portion on the other side of the ram support generally between said fixed bearing portions;
   a pair of adjustable bearing portions for biasing the ram against the pair of fixed bearing portions;
   one of said adjustable bearing portions being positioned on said central bearing portion of the stationary ram support and the other of said adjustable bearing portions being positioned in said outer stationary ram support in opposed relation to one of said pair of fixed bearing portions;
   the adjustable bearing portion on said central portion being adjustable to position said ram with respect to said pair of fixed bearing portions; and
   the other of said adjustable bearing portions being adjustable to position said ram with respect to one of said pair of fixed bearing portions, whereby said ram is positionable totally with respect to said outer stationary ram support by adjustment of only two adjustable bearing portions.

2. A precision head as in claim 1 wherein said bearing portions are roller bearings.

3. A precision head as in claim 2 wherein said roller bearings are mounted in bearing holders.

4. A precision head as in claim 3 wherein said pair of fixed bearing portions include two bearings having perpendicular axis of rotation in one corner of said outer stationary ran support and one bearing in another corner of said outer stationary ram support.

5. A precision head as in claim 4 wherein said stationary ram support is elongate and includes two sets of fixed and adjustable bearing portions, each set being spaced from each other a distance greater than the length of movement of said ram.

6. A precision head as in claim 5 wherein said outer stationary ram support includes a means for locking said adjustable bearing portions against said ram to urge said ram into a pre-aligned relationship.

7. A precision head as in claim 6 wherein said ram support includes a first threaded portion and said adjustable bearing holders including a second threaded portion, said threaded portions being coaxial with each other, said locking means including an adjusting screw having an aperture therethrough extending through said first threaded portion for initially engaging and preloading one of the adjustable bearing portions; and
   a lock screw axially extending through said aperture and threadably engaging the second threaded portion and having its head in abutment with the head of said adjusting screw for locking it to hold the adjustment bearing portion in a prealigned relationship.

8. A precision head for a machine tool comprising:
   an outer stationary ram support;
   an inner ram axially movable, in an axial direction about an axis, in said ram support;
   a plurality of spaced support means mounted in said outer stationary ram support; each support means extending in a plane extending perpendicular to the axial direction and providing free sliding movement of said inner ram relative to said outer ram support;
   each support means including at least two bearing means mounted in spaced relationship and having parallel axis of rotation extending in a perpendicular direction to the axial direction for biasing said inner ram in a transverse direction about the axis, two bearing members mounted in spaced relationship and having coincident axis of rotation extending perpendicular to the parallel axis of said bearing means, and a bearing device having an axis of rotation parallel to the coincident axis of said bearing members and, with the cooperation of said two bearing members, biasing said inner ram in a direction perpendicular to the said transverse direction about the axis thereby to provide accurate linear movement of said inner ram within said outer ram support.

9. A precision head for a machine tool comprising:
a ram; and
an outer ram support including three fixed bearings; a first and second of said bearings being coaxial and in spaced relation, the third being adjacent said first bearings and at 90° to the axis of said first and second fixed bearing; and
two adjustable bearings; a first adjustable bearing being adjacent the second of said coaxial fixed bearings at 90° to the axis of said first and second fixed bearings, and a second adjustable bearing being opposed to said first and second fixed bearings and being located generally therebetween whereby the fixed and adjustable bearings support said ram at three points for free sliding movement.

10. A precision head as in claim 9 wherein said bearings are roller bearings.

11. A precision head as in claim 10 including two sets of spaced, fixed and adjustable bearings.

* * * * *

UNITED STATES PATENT AND TRADEMARK OFFICE
CERTIFICATE OF CORRECTION

PATENT NO. : 5,161,926

DATED : November 10, 1992

INVENTOR(S) : GEORGE W. SCHULZ

It is certified that error appears in the above-identified patent and that said Letters Patent is hereby corrected as shown below:

Column 1, line 9, after "movement" delete " : ".

Column 1, line 51, after "support" delete " : ".

Claim 4, column 4, line 25, delete "ran" and insert therefore -- ram --.

Signed and Sealed this

Fifth Day of October, 1993

BRUCE LEHMAN

Attest:

Attesting Officer

Commissioner of Patents and Trademarks